US008912748B2

(12) United States Patent
Hiebl et al.

(10) Patent No.: US 8,912,748 B2
(45) Date of Patent: Dec. 16, 2014

(54) RADIANT ENERGY POWERED ELECTRICAL POWER SUPPLY DEVICE AND METHOD FOR OPERATING SUCH A POWER SUPPLY DEVICE

(75) Inventors: Manfred Hiebl, Sauerlach (DE); Hans-Wolfgang Pongratz, Taufkirchen (DE)

(73) Assignee: EADS Deutschland GmbH, Ottobrunn (DE)

( * ) Notice: Subject to any disclaimer, the term of this patent is extended or adjusted under 35 U.S.C. 154(b) by 433 days.

(21) Appl. No.: 13/310,296

(22) Filed: Dec. 2, 2011

(65) Prior Publication Data

US 2012/0139473 A1   Jun. 7, 2012

(30) Foreign Application Priority Data

Dec. 3, 2010   (DE) .......................... 10 2010 053 371

(51) Int. Cl.
| | |
|---|---|
| H01M 10/44 | (2006.01) |
| H01M 10/46 | (2006.01) |
| F02M 21/02 | (2006.01) |
| H01M 8/18 | (2006.01) |
| H01M 14/00 | (2006.01) |
| F02M 25/12 | (2006.01) |
| H01M 16/00 | (2006.01) |
| H01M 8/06 | (2006.01) |

(52) U.S. Cl.
CPC ........... *F02M 21/0206* (2013.01); *Y02T 10/121* (2013.01); *Y02E 60/366* (2013.01); *H01M 8/186* (2013.01); *Y02T 10/32* (2013.01); *H01M 14/005* (2013.01); *F02M 25/12* (2013.01); *H01M 16/003* (2013.01); *F02M 21/0227* (2013.01); *Y02E 60/528* (2013.01); *H01M 8/0656* (2013.01)
USPC ......................................................... 320/101

(58) Field of Classification Search
USPC .............. 320/101, 103, 114, 127, 135; 429/7, 429/400; 136/291, 293
See application file for complete search history.

(56) References Cited

U.S. PATENT DOCUMENTS

| | | | |
|---|---|---|---|
| 6,100,600 A | 8/2000 | Pflanz | |
| 2004/0013923 A1 | 1/2004 | Molter et al. | |
| 2009/0025315 A1* | 1/2009 | Gutfleisch | .................... 52/173.3 |

FOREIGN PATENT DOCUMENTS

| | | |
|---|---|---|
| DE | 195 33 097 A1 | 3/1997 |
| DE | 197 14 512 A1 | 10/1998 |
| DE | 100 27 549 A1 | 4/2002 |

(Continued)

OTHER PUBLICATIONS

German Office Action dated Jul. 16, 2012 (six (6) pages).

*Primary Examiner* — Edward Tso
(74) *Attorney, Agent, or Firm* — Crowell & Moring LLP

(57) ABSTRACT

An electrical power supply apparatus supplied with radiant energy is equipped with at least one electrical generator converting radiant energy into electrical power. The electrical power generator can be a photovoltaic solar generator that converts the impinging radiant energy into electrical power. A hydrogen generator produces hydrogen from water and a water reservoir is connected through a first water line to the hydrogen generator. A hydrogen reservoir is connected through a first hydrogen line to the hydrogen generator. A fuel cell or a hydrogen combustion engine is connected to a second electrical power generator, which fuel cell or engine is connected through a second hydrogen line to the hydrogen reservoir and is connected through a second water line to the water reservoir. A control unit is electrically connected to the electrical power generator, hydrogen generator, and fuel cell or hydrogen combustion engine.

16 Claims, 1 Drawing Sheet

(56) References Cited

FOREIGN PATENT DOCUMENTS

| DE | 103 07 112 A1 | 10/2003 |
| DE | 10 2005 046 746 A1 | 4/2007 |
| DE | 10 2006 010 111 A1 | 8/2007 |
| DE | 20 2009 009 648 U1 | 10/2009 |

* cited by examiner

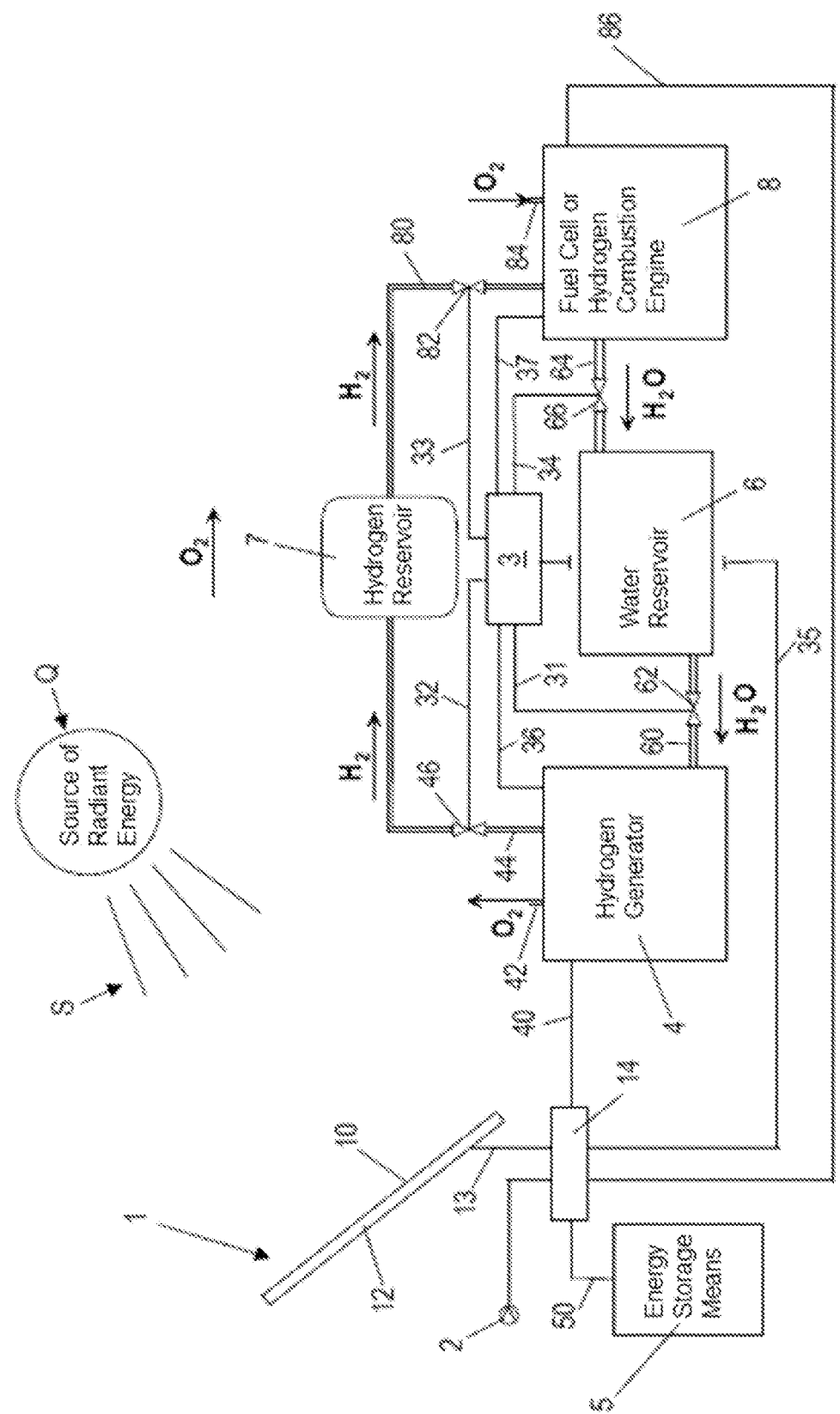

RADIANT ENERGY POWERED ELECTRICAL POWER SUPPLY DEVICE AND METHOD FOR OPERATING SUCH A POWER SUPPLY DEVICE

CROSS REFERENCE TO RELATED APPLICATIONS

The present application claims priority under 35 U.S.C. §119 to German Patent Application No. 10 2010 053 371.8, filed Dec. 3, 2010, the entire disclosure of which is herein expressly incorporated by reference.

BACKGROUND AND SUMMARY OF THE INVENTION

The present invention relates to an electrical power supply apparatus that is supplied with radiant energy, in particular, a photovoltaic electrical power supply apparatus, and a method for operating an electrical power supply apparatus of this type.

Electrical power supply apparatuses that are supplied with radiant energy have the disadvantage that they can only produce electrical power when there is sufficient radiation (e.g., sunlight) striking the electrical power supply apparatus. As a result, electrical or mechanical power is generally available from electrical power supply apparatuses of this type only during the day, whereas no electrical or mechanical power can be produced at night. These known electrical power supply apparatuses are thus not suitable for applications in which electrical or mechanical power needs to be provided around the clock at sites far away from any other sources of electrical power.

Exemplary embodiments of the present invention are directed to an electrical power supply apparatus that is supplied with radiant energy, which apparatus is capable of providing electrical or mechanical power around the clock.

The electrical power supply apparatus according to the invention is equipped with at least one electrical generator converting radiant energy into electrical power, in particular, a photovoltaic solar generator that converts the impinging radiant energy into electrical power; with at least one hydrogen generator to produce hydrogen from water; with at least one water reservoir that is connected through a first water line to the hydrogen generator; with at least one hydrogen reservoir that is connected through a first hydrogen line to the hydrogen generator; with at least one fuel cell or at least one hydrogen combustion engine, which fuel cell or engine is connected through a second hydrogen line to the hydrogen reservoir and is connected through a second water line to the water reservoir, and with a control unit that is electrically connected to the electrical power generator, the hydrogen generator, and the fuel cell or hydrogen engine. To produce electrical power, the hydrogen combustion engine can also be connected to a second electrical power generator associated with this engine, which generator can also be controlled by the control unit. To produce mechanical power, an electric motor supplied with electrical power from the fuel cell can also be provided, which motor can also be controlled by the control unit.

The parallel provision according to the invention of, for example, a photovoltaic solar generator, a hydrogen generator, and a fuel cell enables a portion of the electrical power produced by the solar generator during the day, when sufficient radiant solar energy is available, to be used to produce hydrogen from water, the hydrogen then being recombined in the fuel cell with atmospheric oxygen to form water so as to enable the fuel cell to produce electrical power either at night when radiant solar energy is not available, or whenever radiant solar energy is not available in sufficient amounts. As a result, electrical power is available continuously that can be supplied directly by the solar generator, or indirectly through the fuel cell. The only input energy for this inventive system is the radiant solar energy, since water, hydrogen and oxygen form a closed loop that includes reservoirs for water and for hydrogen.

The power supply apparatus according to the invention is not restricted to radiant solar energy, but instead can be applied wherever an electrical power generator can produce electrical power from a source of radiant energy that does not radiate continuously and wherever an uninterrupted supply of electrical power must be ensured.

In a preferred development, the hydrogen generator includes a water electrolysis unit.

The electrical power generator that is preferably in the form of a solar generator includes at least one support element provided with solar cells, the support element being composed of a panel.

Alternatively, the support element can be composed of a thin film, preferably a polyester film, and furthermore preferably composed of a biaxially oriented polyester film. This structure provides a very low weight for the support element, which exhibits very high strength with low weight—in particular if the element is composed of a biaxially oriented polyester film such as that known, for example, under the trade name "MYLAR."

An especially preferred approach is for the solar cells to be thin-film solar cells, where preferably cadmium-telluride cells in particular are used. Thin-film solar cells also feature very low weight, with the result that in combination with the support element composed of a thin film they provide a very light solar generator.

The electrical power supply apparatus is preferably equipped additionally with an electrical storage means, that can be provided, for example, as a battery. This electrical power storage means forms a buffer storage means that can deliver electrical power on a short-term basis whenever the electrical power generator is not being supplied with sufficient radiant energy for a short period of time. This energy storage means thus functions to bridge the time that is required to activate the fuel cell, or if the fuel cells have not been activated, thereby bridging that time period which is required, for example, during short-term obscuration of sunlight until the sunlight again impinges on the electrical power generator.

The photovoltaic electrical power supply apparatus according to the invention is preferably equipped with a control unit that is designed so that the electrical power produced by the electrical power generator is supplied to a consumer terminal of the electrical power supply apparatus whenever radiant energy is present, and so that this device activates the fuel cell to deliver electrical power to the consumer terminal whenever radiant energy is not available or whenever the electrical power produced by the electrical power generator is not sufficient to meet the specified power requirement. This control unit can ensure that the fuel cell is activated automatically whenever insufficient radiant energy or no radiant energy is available.

That embodiment of the control unit is especially preferred whereby it delivers a portion of the electrical power produced by the electrical power generator to the hydrogen generator when solar radiant energy, in particular, is present, and whereby the device feeds water from the water reservoir to the hydrogen generator such that the hydrogen generator is activated so as to produce hydrogen from the water supplied to it, the hydrogen being stored in the hydrogen reservoir. In this embodiment, a portion of the electrical power produced by the electrical power generator is used to operate the hydrogen generator to produce hydrogen, which is required by the fuel cell to produce electrical power whenever the electrical power generator is supplying no electrical power or insufficient electrical power. The control unit here can control the amount of electrical power that is supplied to the hydrogen generator, or also to control the operating times for the hydrogen generator as a function of the available supply of hydrogen.

It is also advantageous if a portion of the electrical power produced by the electrical power generator and/or by the fuel cell is supplied to the energy storage means in order to charge this energy storage means. This ensures that electrical power is continuously being buffered in the energy storage means, which power can be retrieved directly therefrom when needed.

In a preferred embodiment of the electrical power supply apparatus according to the invention, which embodiment is suitable for applications in vehicles or in aircraft with restricted weight requirements but where sufficient space is available, the hydrogen is stored as a gas in an equalized-pressure balloon or in a very light pressurized tank that is implemented in a manner analogous to a non-rigid airship, which container produces a significant lift force due to the low density of the hydrogen gas, instead of adding weight as in the case with other types of energy storage means (for example, batteries or pressurized gas cylinders).

The present invention is also directed to a method for operating the photovoltaic electrical power supply apparatus.

To this end, a portion of the electrical power produced by the electrical power generator is continuously supplied to the hydrogen generator, whereupon the hydrogen generator separates out the hydrogen from the water supplied from the water reservoir, the hydrogen being stored in the hydrogen reservoir, and the fuel cell produces electrical power from the hydrogen supplied to it from the hydrogen reservoir whenever radiant energy is absent or insufficient radiant energy is provided. If requirements specify a high power-to-weight ratio, a hydrogen combustion engine produces electrical power from the hydrogen supplied from the hydrogen reservoir, which hydrogen combustion engine is equipped with an exhaust-gas turbocharger and high-pressure hydrogen injection unit, and includes a downstream electrical power generator.

This method provides the ability to operate the electrical power supply apparatus continuously over an extended period so that it can supply electrical power around the clock.

The following discussion more thoroughly describes and explains exemplary embodiments of the invention, including further design details and additional advantages, with reference to the attached drawings.

Other objects, advantages and novel features of the present invention will become apparent from the following detailed description of one or more preferred embodiments when considered in conjunction with the accompanying drawings.

BRIEF DESCRIPTION OF THE DRAWINGS

Here:
FIG. 1 is a schematic diagram illustrating a preferred embodiment of the electrical power supply apparatus according to the invention comprising a photovoltaic solar generator.

DETAILED DESCRIPTION OF THE DRAWINGS

FIG. 1 illustrates an electrical power generator 1 in the form of a solar generator that is impinged upon by solar radiant energy S. On its side facing source of radiant energy Q, solar generator 1 is equipped with solar cells 10 that are mounted on a support element 12. Although the FIGURE depicts only one support element 12 provided with solar cells 10, solar generator 1 can also include a plurality of extensive support elements 12 provided with solar cells 10. The solar generator can also have other technologies that enable electrical power to be produced from solar radiant energy.

The electrical power produced in solar generator 1 is fed by a first current lead 13 to an electrical power distribution device 14 associated with solar generator 1. Electrical power distribution device 14 is controlled by a central control unit 3 so that a portion of the electrical power supplied through first current lead 13 is transferred to a hydrogen generator 4 that is provided in the form of a hydrogen electrolysis device.

Another portion of the electrical power introduced into electrical power distribution device 14 is conducted through a third current lead 50 to an energy storage means 5, for example, a battery, in order to charge this if energy storage means 5 should happen not to be sufficiently charged. The rest of the electrical power supplied to electrical power distribution device 14 is passed to a consumer terminal 2 from where the useful electrical power provided by the photovoltaic electrical power supply apparatus can be delivered to consumers of electricity.

Hydrogen generator 4, in the form of a hydrogen electrolysis device, is supplied with water from a water reservoir 6 through a first water line 60. An electrically actuated valve 62 is provided in first water line 60, which valve can be controlled through a first control line 31 by control unit 3 so as to control the inflow of water from water reservoir 6 to hydrogen generator 4.

The water introduced into hydrogen generator 4 is separated into oxygen and hydrogen by the electricity supplied through a second electric line 40 from electrical power distribution device 14. The oxygen is dispersed through a venting unit 42 to the environment, while hydrogen is fed through a first hydrogen line 44 into a hydrogen reservoir 7.

The hydrogen can be stored in hydrogen reservoir 7 using a known technique, for example, by compressing the hydrogen fed through line 44 and storing it in a pressure vessel or by storing it in a molecular sieve.

An electrically actuated valve 46 is provided in first hydrogen line 44, which valve can be controlled through a second control line 32 by control unit 3 in order to regulate the volumetric flow of hydrogen that is passed through first hydrogen line 44, and to prevent any reverse flow of hydrogen from hydrogen reservoir 7 back into hydrogen generator 4.

The FIGURE furthermore schematically illustrates a fuel cell 8 to which hydrogen is supplied from hydrogen reservoir 7 through a second hydrogen line 80. If requirements specify a high power-to-weight ratio, the fuel cell can be replaced by a hydrogen combustion engine that is preferably equipped with an exhaust-gas turbocharger and high-pressure hydrogen injection unit, and a second downstream electrical power generator. An electrically actuated valve 82 is also provided in second hydrogen line 80, which valve is controlled from control unit 3 through a third control line 33 in order to regulate the volumetric flow of hydrogen through second hydrogen line 80.

Fuel cell 8, or the hydrogen combustion engine, furthermore includes a vent opening 84 through which air and thus oxygen from the atmosphere can enter. Electrical power is produced in a known manner from the supplied hydrogen and entering oxygen from the air, the electrical power being passed through a fourth current lead 86 to electrical power distribution device 14.

The water created during the recombination of hydrogen and oxygen in the fuel cell or in the hydrogen combustion engine is passed by a second water line 64 into water reservoir 6. An electrically actuated valve 66 is also provided in second water line 64, which valve can be controlled by control unit 3 through a fourth control line 34.

Control unit 3 is connected through a fifth control line 35 (shown as a broken line in the FIGURE) to electrical power distribution device 14 in order to control electrical power distribution device 14, and thus the distribution of the electrical power introduced into electrical power distribution device 14 through first current lead 13 and fourth current lead 86.

In addition, control unit 3 is connected through a sixth control line 36 to hydrogen generator 4 in order to control this generator. A seventh control line 37 connects control unit 3 to fuel cell 8, or to the hydrogen combustion engine with generator so as to control this cell or engine.

As the FIGURE shows, a closed loop of hydrogen ($H_2$) and water ($H_2O$) encompassing water reservoir 6 and hydrogen reservoir 7 is created between hydrogen generator 4, and fuel cell 8 or the hydrogen combustion engine, this loop being indicated by the arrows. The oxygen ($O_2$) is transported through an open loop from hydrogen generator 4 to fuel cell 8, or to the hydrogen combustion engine through the atmosphere, as is indicated symbolically by the respective arrows.

The photovoltaic electrical power supply apparatus according to the invention is thus supplied exogenously only by solar radiant energy S, wherein part of the electrical power obtained is used to fill a buffer storage means (energy storage means 5 and water reservoir 7) from which stored energy can then be retrieved and supplied as electrical power to consumer terminal 2 whenever peak loads require this, or whenever no solar radiant energy S, or only insufficient solar radiant energy is available.

The reference characters in the claims, description, and drawings are intended only to enhance understanding of the invention and are not intended to restrict the scope of protection.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

List of Reference Characters:
1 electrical power generator
2 consumer terminal
3 control unit
4 hydrogen generator
6 water reservoir
7 hydrogen reservoir
8 fuel cell or hydrogen combustion engine with electrical power generator
10 solar cells
12 support element
13 first current lead
14 electrical power distribution device
31 first control line
32 second control line
33 third control line
34 fourth control line
35 fifth control line
36 sixth control line
37 seventh control line
40 second electric line
42 venting unit
44 first hydrogen line
46 electrically actuated valve
50 third electric line
60 first water line
62 electrically actuated valve
64 second water line
80 second hydrogen line
82 electrically actuated valve
84 vent opening
86 fourth current lead
Q source of radiant energy
S radiant energy

What is claimed is:

1. An electrical power supply apparatus that is supplied with radiant energy, comprising:
   a first electrical power generator configured to convert radiant energy into electrical power;
   a hydrogen generator configured to produce hydrogen from water;
   a water reservoir connected through a first water line to the hydrogen generator;
   a hydrogen reservoir connected through a first hydrogen line to the hydrogen generator;
   a hydrogen combustion engine connected to a second electrical power generator or a fuel cell, wherein the fuel cell or hydrogen combustion engine is connected through a second hydrogen line to the hydrogen reservoir and through a second water line to the water reservoir; and
   a control unit that is electrically connected to the first electrical power generator, the hydrogen generator, and is also electrically connected to the fuel cell or the hydrogen combustion engine.

2. The electrical power supply apparatus according to claim 1, wherein the hydrogen generator includes a water electrolysis unit.

3. The electrical power supply apparatus according to claim 1, wherein the first electrical power generator is a solar generator that includes a support element provided with solar cells, and the support element is composed of a panel.

4. The electrical power supply apparatus according to claim 1, wherein the first electrical power generator is a solar generator that includes a support element provided with solar cells, and the support element is composed of a thin film.

5. The electrical power supply apparatus according to claim 4, wherein the thin film is a polyester film.

6. The electrical power supply apparatus according to claim 5, wherein the polyester film is a biaxially oriented polyester film.

7. The electrical power supply apparatus according to claim 3, wherein the solar cells are thin-film solar cells.

8. The electrical power supply apparatus according to claim 7, wherein the thin-film solar cells are cadmium-telluride cells.

9. The electrical power supply apparatus according to claim 4, wherein the solar cells are thin-film solar cells.

10. The electrical power supply apparatus according to claim 9, wherein the thin-film solar cells are cadmium-telluride cells.

11. The electrical power supply apparatus according to claim 1, further comprising:
    a battery.

12. The electrical power supply apparatus according to claim 1, wherein the control unit is configured to control the electrical power supply apparatus such that the electrical power produced by the first electrical power generator is supplied to a consumer terminal of the electrical power supply apparatus when radiant energy is available, and the fuel cell is activated to deliver electrical power to the consumer terminal when radiant energy is not available or when the electrical power produced by the first electrical power generator is insufficient for a specified power requirement.

13. The electrical power supply apparatus according to claim 12, wherein the control unit is configured to control the electrical power supply apparatus such that a portion of the electrical power produced by the first electrical power generator is supplied to the hydrogen generator when radiant energy is available, and water is supplied from the water reservoir to the hydrogen generator, and the hydrogen generator is activated to produce hydrogen from the water supplied to it, wherein the hydrogen is stored in the hydrogen reservoir.

14. The electrical power supply apparatus according to claim 13, wherein the portion of the electrical power produced by the first electrical power generator, the fuel cell, or by the hydrogen combustion engine with second electrical power generator, is supplied to an energy storage means so as to charge the energy storage means.

15. The electrical power supply apparatus according to claim 1, wherein the hydrogen reservoir is configured to take up the hydrogen as a gas in an equalized-pressure balloon or pressurized balloon that is employed simultaneously as an energy storage means and as a lift-generating element.

16. A method for operating an electrical power supply apparatus, comprising:

continuously supplying at least a portion of electrical power produced by first electrical power generator to a hydrogen generator;

separating, by the hydrogen generator, hydrogen from water supplied to the hydrogen generator from a water reservoir;

storing the hydrogen in a hydrogen reservoir;

producing electrical power by a fuel cell or hydrogen combustion engine with an electrical power generator from the hydrogen supplied to it from the hydrogen reservoir whenever no radiant energy or insufficient radiant energy is available; and storing water generated during the production of electrical power by the fuel cell or the hydrogen combustion engine in the water reservoir.

* * * * *